(12) United States Patent
Tanase et al.

(10) Patent No.: US 9,834,185 B2
(45) Date of Patent: Dec. 5, 2017

(54) VEHICLE BRAKING CONTROL APPARATUS

(71) Applicants: TOYOTA JIDOSHA KABUSHIKI KAISHA, Toyota-shi, Aichi-ken (JP); ADVICS CO., LTD., Kariya-shi, Aichi-ken (JP)

(72) Inventors: Masayasu Tanase, Toyota (JP); Wataru Ike, Nagoya (JP); Yosuke Ohmori, Kariya (JP)

(73) Assignees: TOYOTA JIDOSHA KABUSHIKI KAISHA, Toyota (JP); ADVICS CO., LTD., Kariya-shi (JP)

( * ) Notice: Subject to any disclaimer, the term of this patent is extended or adjusted under 35 U.S.C. 154(b) by 0 days.

(21) Appl. No.: 14/995,827

(22) Filed: Jan. 14, 2016

(65) Prior Publication Data

US 2016/0221549 A1 Aug. 4, 2016

(30) Foreign Application Priority Data

Jan. 29, 2015 (JP) .................................. 2015-015959

(51) Int. Cl.
*B60T 7/22* (2006.01)
*B60T 8/172* (2006.01)
*B60T 8/1755* (2006.01)

(52) U.S. Cl.
CPC ................ *B60T 7/22* (2013.01); *B60T 8/172* (2013.01); *B60T 8/1755* (2013.01); *B60T 2201/022* (2013.01)

(58) Field of Classification Search
CPC .... B60T 7/22; B60T 2201/022; B60T 8/1755; B60T 8/172
See application file for complete search history.

(56) References Cited

U.S. PATENT DOCUMENTS

2009/0018740 A1   1/2009 Noda et al.
2009/0299578 A1*  12/2009 Lucas ................... B60R 21/013
                                                    701/46

(Continued)

FOREIGN PATENT DOCUMENTS

JP       2001-122094 A       5/2001
JP       EP 1818231 A2 *     8/2007 ................ B60T 7/22

(Continued)

*Primary Examiner* — Tuan C. To
(74) *Attorney, Agent, or Firm* — Oliff PLC (57) ABSTRACT

A vehicle braking control apparatus includes an obstacle detection unit configured to detect an obstacle ahead of a vehicle, and to detect a distance to the obstacle from the vehicle, and a relative speed of the obstacle with respect to the vehicle; an electronic control unit configured to generate a braking force of the vehicle automatically based on the distance and the relative speed, and to weaken the braking force when a value subtracting a deceleration amount of a vehicle speed of the vehicle since a start of generating the braking force, from a predetermined upper-limit deceleration amount is less than or equal to a predetermined threshold. The upper-limit deceleration amount is set to increase while an elapsed time increases since the start of generating the braking force, at least after a predetermined first time has passed since the start of generating the braking force.

6 Claims, 8 Drawing Sheets

(56) References Cited

U.S. PATENT DOCUMENTS

| | | | |
|---|---|---|---|
| 2011/0160974 A1* | 6/2011 | Fukuda | B60T 7/12 701/70 |
| 2013/0110368 A1* | 5/2013 | Zagorski | B60T 7/22 701/70 |
| 2013/0173113 A1* | 7/2013 | Takiguchi | B60K 26/021 701/36 |
| 2013/0245894 A1* | 9/2013 | Huth | B60R 21/013 701/45 |
| 2015/0019101 A1* | 1/2015 | Bajorat | B60T 7/085 701/71 |
| 2015/0046054 A1* | 2/2015 | Takahashi | B60T 7/22 701/70 |
| 2015/0120160 A1* | 4/2015 | Foltin | B60W 30/0956 701/70 |
| 2015/0210280 A1* | 7/2015 | Agnew | B60W 30/09 701/48 |
| 2015/0353062 A1* | 12/2015 | Breuer | B60T 7/22 701/70 |
| 2016/0075313 A1* | 3/2016 | Moriizumi | B60T 7/12 701/93 |
| 2016/0144841 A1* | 5/2016 | White | B60T 8/17636 701/70 |
| 2016/0207530 A1* | 7/2016 | Stanek | B60W 30/09 |
| 2016/0272171 A1* | 9/2016 | Bunk | B60W 10/12 |
| 2016/0375775 A1* | 12/2016 | Imanishi | B60L 7/26 701/70 |

FOREIGN PATENT DOCUMENTS

| | | | | |
|---|---|---|---|---|
| JP | 2007326548 A | * | 12/2007 | B60T 7/22 |
| JP | 2008-308036 A | | 12/2008 | |
| JP | 2009-018721 A | | 1/2009 | |
| JP | 2012-121534 A | | 6/2012 | |
| JP | WO 2013150600 A1 | * | 10/2013 | B60T 7/22 |
| JP | 2013256223 A | * | 12/2013 | B60T 7/22 |
| WO | 2014/174585 A1 | | 10/2014 | |

\* cited by examiner

VEHICLE BRAKING CONTROL APPARATUS

FIELD

The disclosures herein generally relate to a vehicle braking control apparatus that avoids a collision with an obstacle ahead of a vehicle.

BACKGROUND

Conventionally, an automatic braking apparatus has been known that detects an obstacle in front of a vehicle, and if a collision with the obstacle is predicted, has the vehicle execute braking automatically (see, for example, Japanese Laid-open Patent Publication No. 2012-121534). In this way, by having the vehicle execute braking automatically, if a collision with the obstacle is predicted, it is possible to avoid the collision with the obstacle in front of the vehicle.

However, a following vehicle needs to execute braking or to change the lane in response to the automatic braking of the vehicle. Therefore, depending on how the automatic braking of the vehicle is executed, the driver of the following vehicle may not be able to perform an appropriate driving operation following the automatic braking of the vehicle.

In view of the above, it is a general object of at least one embodiment to provide a vehicle braking control apparatus that can have a vehicle execute braking automatically to avoid a collision with an obstacle ahead of the vehicle, and to make it possible for the driver of a following vehicle to perform an appropriate driving operation following the behavior of the vehicle avoiding the collision.

SUMMARY

According to an embodiment, a vehicle braking control apparatus includes an obstacle detection unit configured to detect an obstacle ahead of a vehicle, and to detect a distance to the obstacle from the vehicle, and a relative speed of the obstacle with respect to the vehicle; an electronic control unit configured to generate a braking force of the vehicle automatically based on the distance and the relative speed, and to weaken the braking force when a value subtracting a deceleration amount of a vehicle speed of the vehicle since a start of generating the braking force, from a predetermined upper-limit deceleration amount is less than or equal to a predetermined threshold. The upper-limit deceleration amount is set to increase while an elapsed time increases since the start of generating the braking force, at least after a predetermined first time has passed since the start of generating the braking force.

According to an embodiment, it is possible to provide a vehicle braking control apparatus that can have a vehicle execute braking automatically to avoid a collision with an obstacle ahead of the vehicle, and to make it possible for the driver of a following vehicle to perform an appropriate driving operation following the behavior of the vehicle avoiding the collision.

DESCRIPTION OF EMBODIMENTS

In the following, embodiments will be described with reference to the drawings.

First Embodiment

Figure 1:
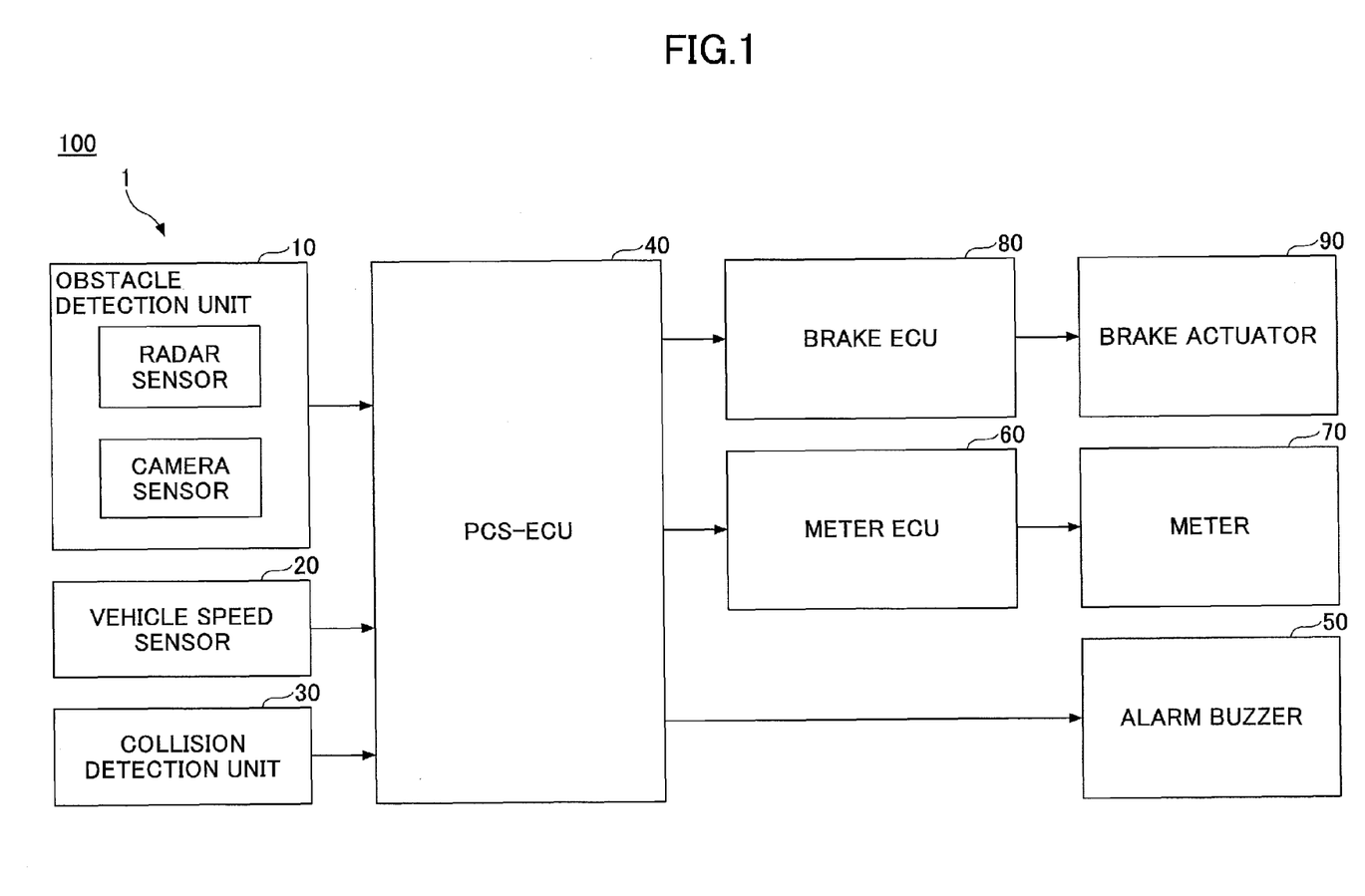
FIG. 1 is a block diagram that illustrates an example of a configuration of a braking control apparatus.

FIG. 1 is a block diagram that illustrates an example of a configuration of a braking control apparatus 1 according to a first embodiment. In the following, notations about directions, "front", "rear", "left", "right", "up", and "down" designate front, rear, left, and right, up, and down directions, respectively, with respect to a vehicle 100.

The braking control apparatus 1 is installed in the vehicle 100, and executes a drive support to generate a braking force of the vehicle 100 automatically, to prevent the vehicle 100 from colliding with an obstacle.

Note that the vehicle 100 may be an arbitrary vehicle, such as a vehicle having an engine as an only driving force source, or an electrically driven vehicle (a hybrid vehicle, a range extender vehicle, an electric vehicle (vehicle having a motor as an only driving force source)).

The braking control apparatus 1 according to the embodiment is configured to include an obstacle detection unit 10, a vehicle speed sensor 20, a collision detection unit 30, a pre-crash-safety electronic control unit (PCS-ECU) 40, an alarm buzzer 50, a meter ECU 60, a meter 70, a brake ECU 80, and a brake actuator 90.

The obstacle detection unit 10 detects an obstacle (a preceding vehicle, a pedestrian, a fixed object on a road, etc.), ahead of the vehicle 100, and detects the distance from the vehicle 100 to the obstacle (simply referred to as the "distance to the obstacle" below), and the relative speed of the obstacle with respect to the vehicle 100 (simply referred to as the "relative speed of the obstacle" below). The obstacle detection unit 10 includes a radar sensor 11 and a camera sensor 12.

The radar sensor 11 is a known obstacle detection unit, for example, a millimeter-wave radar or a laser radar, to detect an obstacle ahead of the vehicle 100, by transmitting a detection wave (a radio wave, a light wave, etc.) ahead of the vehicle 100, and receiving a reflected wave that corresponds to the detection wave. The radar sensor 11 may be built in the vehicle 100, for example, around the center in the left and right direction of the front bumper or in the front grill; and may transmit a detection wave in a predetermined range of angles in the left and right direction, and in the up and down direction around a predetermined axis (optical axis) as the center that extends ahead of the vehicle 100.

The camera sensor 12 is a known obstacle detection unit to detect an obstacle ahead of the vehicle 100, by capturing an image ahead of the vehicle 100 by using an imaging element, for example, a CCD (Charge Coupled Device), or a CMOS (Complementary Metal-Oxide Semiconductor), and applying predetermined image processing to the captured image. The camera sensor 12 may be built in the vehicle 100, for example, around the center in the left and right direction of an upper part of the front window in the vehicle compartment; and may capture an image in a predetermined range of angles in the left and right direction, and in the up and down direction around an imaging direction as the center that extends ahead of the vehicle 100.

The obstacle detection unit 10 may take advantage of both characteristics (strengths) of the radar sensor 11 and the camera sensor 12, to generate information (the distance to an obstacle, the relative speed of the obstacle, etc.) that integrates (fuses) the distance to the obstacle, the relative speed of the obstacle, etc., detected by both. The obstacle detection unit 10 is connected with the PCS-ECU 40 to communicate with each other via a one-to-one communication line (a direct line) or an in-vehicle LAN or the like, to transmit generated obstacle information to the PCS-ECU 40. Also, if not detecting an obstacle ahead of the vehicle 100, the obstacle detection unit 10 does not transmit obstacle information, or transmits information representing that an obstacle is not detected.

Note that if detecting multiple obstacles, the obstacle detection unit 10 may transmit obstacle information about an obstacle having the shortest distance from the vehicle 100 (namely, the obstacle generating a highest emergency to be dealt with, as a target of drive supports to avoid a collision), to the PCS-ECU 40.

Also, a part of functions in the obstacle detection unit 10 may be executed by a unit outside of the obstacle detection unit 10 (for example, the PCS-ECU 40). For example, the obstacle detection unit 10 may only detect an obstacle (by transmitting a detection wave by the radar sensor 11 and receiving a reflected wave, and/or by capturing an image ahead of the vehicle 100 by the camera sensor 12), and the other processing functions may be executed by the PCS-ECU 40 that include detecting (calculating) the distance to the obstacle and the relative speed of the obstacle.

The vehicle speed sensor 20 is a known vehicle speed detection unit to detect the vehicle speed of the vehicle 100. The vehicle speed sensor 20 is connected with the PCS-ECU 40 to communicate with each other via a direct line, an in-vehicle LAN or the like, to transmit a signal that corresponds to a detected vehicle speed (a vehicle speed signal), to the PCS-ECU 40.

The collision detection unit 30 is a collision detection unit to detect a collision with an obstacle ahead of the vehicle 100. The collision detection unit 30 may include, for example, an acceleration sensor to detect a steep change of acceleration of the vehicle 100; a distortion sensor to detect distortion of a front part of the vehicle 100; and a pressure sensor to detect a steep change of pressure in a pressure chamber disposed in the front bumper of the vehicle 100. The collision detection unit 30 detects an occurrence of a collision with an obstacle in response to output signals of the sensors. The collision detection unit 30 is connected with the PCS-ECU 40 to communicate with each other via a direct line, an in-vehicle LAN or the like, and if detecting an occurrence of a collision with an obstacle, transmits a signal that corresponds to the occurrence of the collision with the obstacle (collision signal) to the PCS-ECU 40.

Note that a part of functions in the collision detection unit 30 may be executed by a unit outside of the collision detection unit 30 (for example, the PCS-ECU 40). For example, the collision detection unit 30 may specialize in the sensor functions by the acceleration sensor, the distortion sensor, the pressure sensor, and the like, while detection (determination) of an occurrence of a collision with an obstacle may be executed by the PCS-ECU 40, based on detection signals of the sensors (the acceleration sensor, the distortion sensor, the pressure sensor, and the like) transmitted from the collision detection unit 30.

The PCS-ECU 40 is an electronic control unit to execute a main control process in the braking control apparatus 1. The PCS-ECU 40 may be configured with, for example, a microcomputer to execute various control processes by running various programs stored in a ROM, on a CPU.

Note that the PCS-ECU 40 is connected with the alarm buzzer 50, the meter ECU 60, the brake ECU 80 and the like to communicate with each other via a direct line, an in-vehicle LAN or the like.

The PCS-ECU 40 calculates a TTC (time to collision) that corresponds to a time until the vehicle 100 collides with an obstacle ahead of it, in a circumstance where an obstacle is detected by the obstacle detection unit 10. Specifically, based on obstacle information (the distance D to the obstacle and the relative speed Vr of the obstacle) received from the obstacle detection unit 10, the PCS-ECU 40 calculates the TTC (=D/Vr).

Note that the TTC may be calculated by considering the rate of change of the relative speed of an obstacle, namely, the relative acceleration of the obstacle with respect to the vehicle 100 (simply referred to as the "relative acceleration of the obstacle" below), and/or deceleration caused by a braking force of the vehicle 100 that is generated by automatic braking, which will be described later.

Also, based on the calculated TTC, the PCS-ECU 40 executes drive supports to avoid a collision between the vehicle 100 and the obstacle detected by the obstacle detection unit 10. In the following, an overview of the drive supports executed by the PCS-ECU 40 will be described using FIG. 2.

Figure 2A:
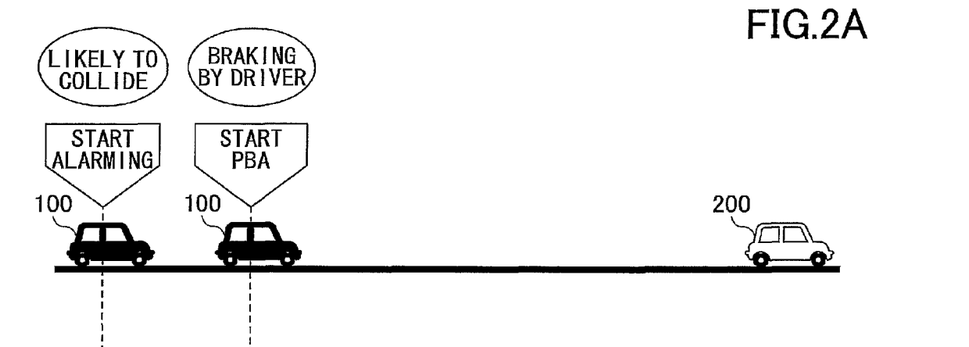
FIGS. 2A-2D are diagrams that illustrate aspects of drive supports by a braking control apparatus (PCS-ECU)
Figure 2B:
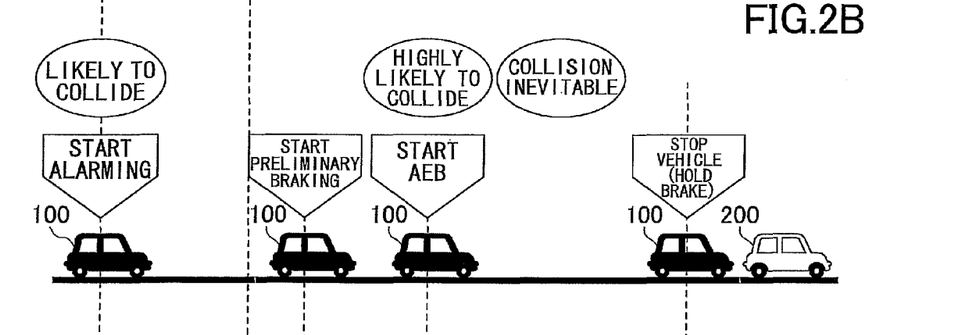
Figure 2C:
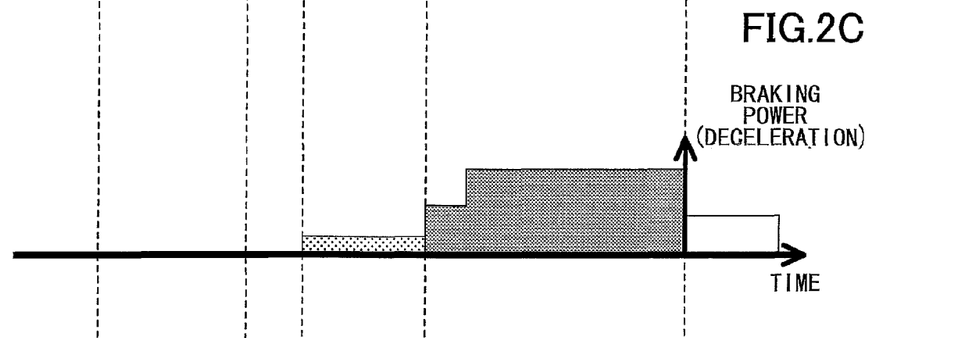
Figure 2D:
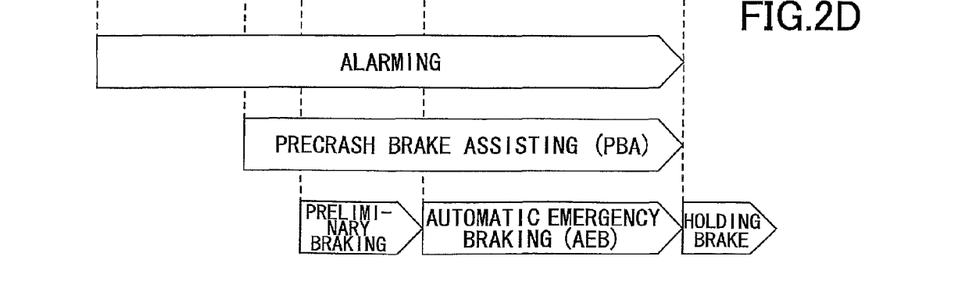

FIGS. 2A-2D are diagrams that illustrate aspects of the drive supports by the braking control apparatus 1 (the PCS-ECU 40). FIG. 2A is a diagram that illustrates an aspect of the drive supports in a time series when the driver performs a braking operation in response to alarming, which will be described later. FIG. 2B is a diagram that illustrates an aspect of the drive supports in a time series when the driver does not perform a braking operation even upon the alarming. FIG. 2C is a diagram that schematically represents the braking force (deceleration) that is generated with the case of FIG. 2B by the drive supports (preliminary braking, automatic braking, and brake holding), which will be described later. FIG. 2D is a diagram that represents operational durations of the drive supports that correspond to those in FIGS. 2A-2B.

Assume that another vehicle 200 stops in FIGS. 2A-2B, which is illustrated as an obstacle.

As illustrated in FIGS. 2A-2B, if determining that there is a likelihood of a collision with the obstacle (the other vehicle 200) based on the calculated TTC, the PCS-ECU 40 starts alarming to warn the driver of the vehicle 100. Specifically, the PCS-ECU 40 starts outputting an operation signal to the alarm buzzer 50, and starts outputting a request for alarm display to the meter ECU 60. This makes the alarm buzzer 50 generate a buzzer sound, and makes the meter ECU 60 display the alarm indicating that there is a likelihood of a collision with the obstacle, on the meter 70. Therefore, it is possible for the driver of the vehicle 100 to recognize that there is a likelihood of a collision with the obstacle.

If the driver recognizes the likelihood of the collision with the obstacle by the alarming, and performs a braking operation, the PCS-ECU 40 starts pre-crash brake assisting (PBA) as illustrated in FIG. 2A. In other words, the PCS-ECU 40 executes the drive support (PBA) to generate a braking force needed to avoid the collision with the obstacle (the other vehicle 200), by adding an assisting braking force to the braking force corresponding to the braking operation by the driver. Specifically, the PCS-ECU 40 transmits a request for the assisting to the brake ECU 80, to have the brake ECU 80 control the brake actuator 90 to generate the braking force of the vehicle 100 needed to avoid a collision, which is obtained by adding an assisting braking force to the braking force corresponding to the braking operation by the driver.

On the other hand, if the driver does not perform a braking operation even upon the alarming, the PCS-ECU 40 starts preliminary braking based on the calculated TTC as illustrated in FIG. 2B. In other words, the PCS-ECU 40 generates a braking force with which the vehicle 100 hardly decelerates, and turns on a stop lamp (not illustrated) disposed at a rear end part of the vehicle 100. Specifically, the PCS-ECU 40 transmits a request for preliminary braking to the brake ECU 80, to have the brake ECU 80 control the brake actuator 90 and the stop lamp (and a relay to drive it) to generate the braking force of the vehicle 100 and to turn on the stop lamp. Thus, it is possible to have the driver of a vehicle behind the vehicle 100 (the following vehicle) recognize in advance that automatic braking will be executed, which will be described later.

As illustrated in FIG. 2B, in a circumstance where the driver does not perform a braking operation, if determining during the preliminary braking that the likelihood is high for a collision with the obstacle (the other vehicle 200) based on the calculated TTC, the PCS-ECU 40 starts automatic emergency braking (AEB). In other words, the PCS-ECU 40 executes the drive support (AEB) to generate a braking force of the vehicle 100 automatically irrespective of a braking operation by the driver. Specifically, the brake ECU 80 outputs a request for automatic braking, to have the brake ECU 80 control the brake actuator 90 to generate the braking force of the vehicle 100 automatically. By having the AEB start operating, the braking force generated for the vehicle 100 increases stepwise from the beginning of the AEB, for example, two stages as illustrated in FIG. 2C, to reach a braking force (maximum value) to avoid a collision with the obstacle (the other vehicle 200).

When the vehicle 100 is stopped by the AEB without colliding with the other vehicle 200, the PCS-ECU 40 executes a drive support (brake holding) to hold the braking force to maintain the stoppage of the vehicle 100 for a certain duration as illustrated in FIGS. 2C-2D. Specifically, the PCS-ECU 40 transmits a request for brake holding, to have the brake ECU 80 control the brake actuator 90 to generate the braking force to maintain the stoppage.

As illustrated in FIG. 2D, the alarming, PBA, and AEB executed by the PCS-ECU 40 are continued until the vehicle 100 is stopped.

In this way, based on the calculated TTC and the like, the PCS-ECU 40 executes the drive supports (alarming, PBA, preliminary braking, AEB, and brake holding) to avoid a collision between the vehicle 100 and an obstacle.

In the following, drive supports (alarming, preliminary braking, AEB, and brake holding) will be described for a case where the driver does not perform a braking operation upon the alarming (a case of FIG. 2B).

Here, using FIGS. 3-4, a control process of the drive supports by the PCS-ECU 40 will be described in detail.

Figure 3:
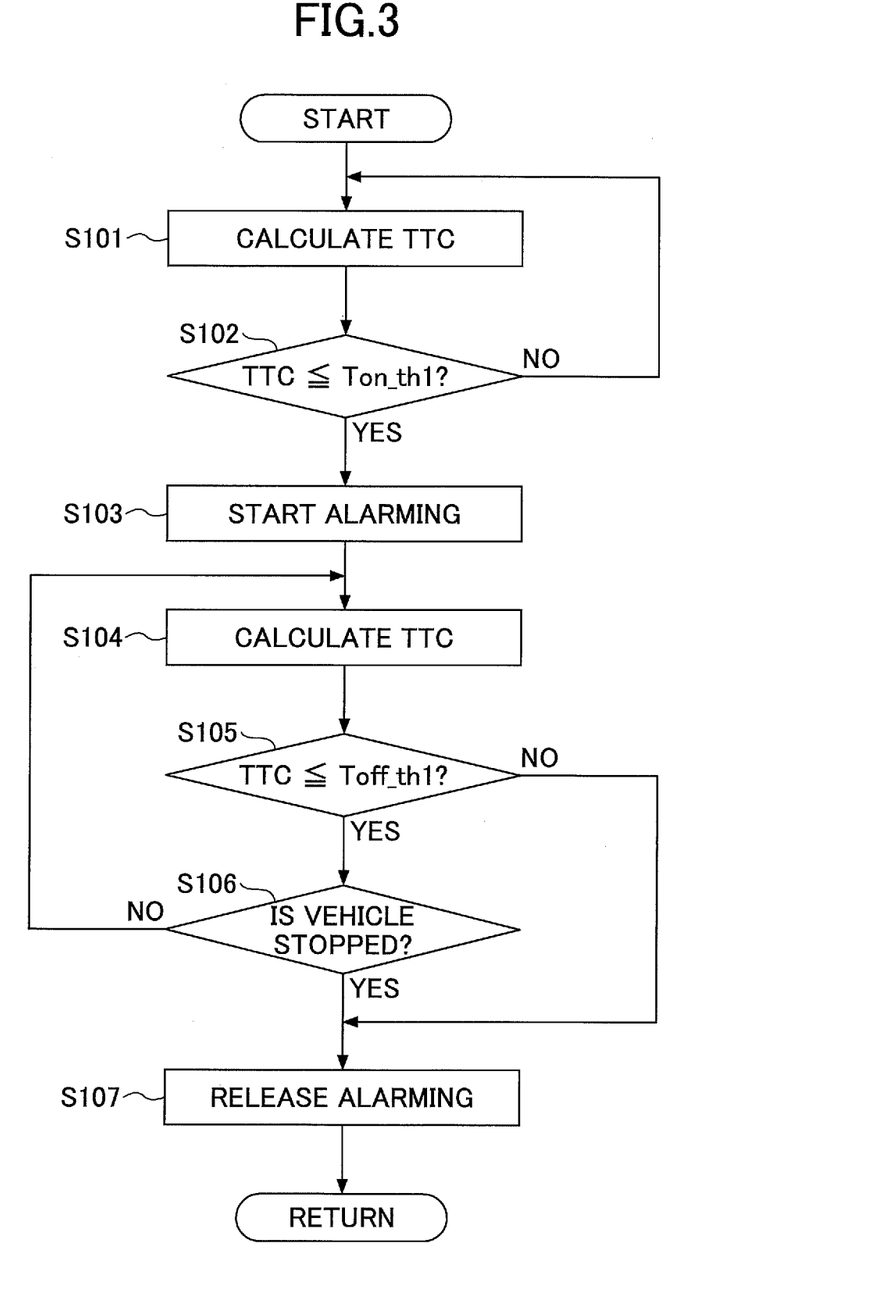
FIG. 3 is a flowchart that illustrates an example of an alarming process by a braking control apparatus (PCS-ECU)

First, FIG. 3 is a flowchart that illustrates an example of an alarming process by the braking control apparatus 1 (the PCS-ECU 40). A process of this flowchart is started if an obstacle ahead of the vehicle 100 is detected by the obstacle detection unit 10 (an obstacle closest to the vehicle 100 if multiple obstacles are detected), and repeatedly executed while the obstacle is being detected. Also, while executing a, process of the flowchart, if a collision with an obstacle is detected by the collision detection unit 30, the PCS-ECU 40 terminates the process, and maintains a state generating the braking force of the vehicle 100 automatically until the vehicle 100 is stopped.

At Step S101, based on obstacle information (the distance to the obstacle and the relative speed of the obstacle) received from the obstacle detection unit 10, the PCS-ECU 40 calculates a TTC.

At Step S102, the PCS-ECU 40 determines whether there is a likelihood of a collision with an obstacle detected by the obstacle detection unit 10. Specifically, the PCS-ECU 40 determines whether the calculated TTC is less than or equal to a predetermined time Ton_th1. If the TTC is not less than or equal to the predetermined time Ton_th1, the PCS-ECU 40 goes back to Step S101 to repeat Steps S101 to S102; or if the TTC is less than or equal to the predetermined time Ton_th1, the PCS-ECU 40 goes forward to Step S103.

Note that the predetermined time Ton_th1 may be determined appropriately as a value with which it is possible to determine that there is a likelihood of a collision with an obstacle, based on an experiment or a computer simulation in advance.

At Step S103, the PCS-ECU 40 starts alarming. Specifically, the PCS-ECU 40 transmits an operation signal to the alarm buzzer 50, and transmits a request for alarm display to the meter ECU 60. Thus, the alarm buzzer 50 generates a buzzer sound, and the meter ECU 60 displays the alarm.

At Step S104, the PCS-ECU 40 calculates a TTC based on the obstacle information (the distance to the obstacle and the relative speed of the obstacle) received from the obstacle detection unit 10.

At Step S105, the PCS-ECU 40 determines whether the likelihood of the collision with the obstacle still exists. Specifically, the PCS-ECU 40 determines whether the calculated TTC is less than or equal to a predetermined time Toff_th1. If the calculated TTC is less than or equal to the predetermined time Toff_th1, the PCS-ECU 40 determines that the likelihood of the collision with the obstacle still exists, and goes forward to Step S106. On the other hand, if the calculated TTC is not less than or equal to the predetermined time Toff_th1, the PCS-ECU 40 determines that there is no likelihood of a collision with the obstacle (a collision is avoided), and goes forward to Step S107.

Note that the predetermined time Toff_th1 may be set equivalent to the predetermined time Ton_th1, or preferably set to a value greater than the predetermined time Ton_th1. By setting the predetermined time Toff_th1 to a value greater than the predetermined time Ton_th1, hunting can be prevented in which alarming is turned on and off frequently and repeatedly.

At Step S106, the PCS-ECU 40 determines whether the vehicle 100 is stopped based on a vehicle speed signal received from the vehicle speed sensor 20. If the vehicle 100 is not stopped, the PCS-ECU 40 goes back to Step S104 to repeat Steps S104 to S106; or if the vehicle 100 is stopped, the PCS-ECU 40 goes forward to Step S107.

At Step S107, the PCS-ECU 40 releases the alarming. Specifically, the PCS-ECU 40 transmits an operation release signal to the alarm buzzer 50, and transmits a request for releasing the alarm display to the meter ECU 60. Thus, the alarm buzzer 50 stops generating the buzzer sound, and the meter 70 releases the alarm display.

Figure 4:
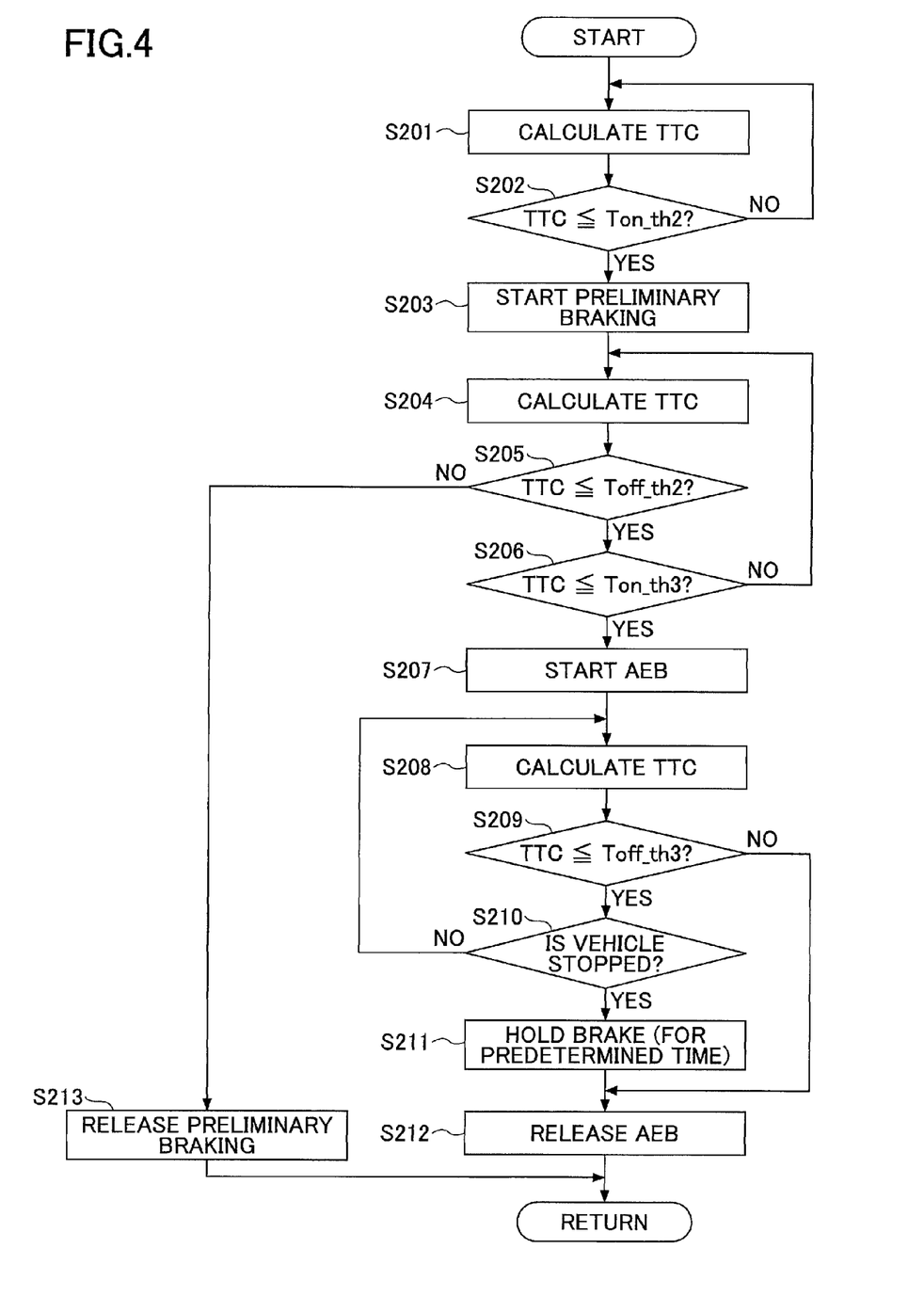
FIG. 4 is a flowchart that illustrates an example of an automatic braking process by a braking control apparatus (PCS-ECU)

Next, FIG. 4 is a flowchart that illustrates an example of a process of preliminary braking and AEB including brake holding (an automatic braking process) by the braking control apparatus 1 (the PCS-ECU 40). A process of this flowchart is started if an obstacle ahead of the vehicle 100 is detected by the obstacle detection unit 10 (an obstacle closest to the vehicle 100 if multiple obstacles are detected), and repeatedly executed while the obstacle is being detected. Also, while executing a process of the flowchart, if a collision with an obstacle is detected by the collision detection unit 30, the PCS-ECU 40 terminates the process, and maintains a state generating the braking force of the vehicle 100 automatically until the vehicle 100 is stopped.

At Step S201, based on obstacle information (the distance to the obstacle and the relative speed of the obstacle) received from the obstacle detection unit 10, the PCS-ECU 40 calculates a TTC.

At Step S202, the PCS-ECU 40 determines whether the likelihood of the collision with the obstacle detected by the obstacle detection unit 10 has risen to a certain level. Specifically, the PCS-ECU 40 determines whether the calculated TTC is less than or equal to a predetermined time Ton_th2. If the TTC is not less than or equal to the predetermined time Ton_th2, the PCS-ECU 40 goes back to Step S201 to repeat Steps S201 to S202; or if the TTC is less than or equal to the predetermined time Ton_th2, the PCS-ECU 40 goes forward to Step S203.

Note that the predetermined time Ton_th2 may be set appropriately to a value less than the predetermined time Ton_th1, based on an experiment or a computer simulation in advance.

At Step S203, the PCS-ECU 40 starts preliminary braking. Specifically, the PCS-ECU 40 transmits a request for preliminary braking to the brake ECU 80. Thus, in response to the control command from the brake ECU 80, the brake actuator 90 and the stop lamp (not illustrated) start operating to generate a braking force with which the vehicle 100 hardly decelerates, and to turn on the stop lamp, respectively.

At Step S204, based on obstacle information (the distance to the obstacle and the relative speed of the obstacle) received from the obstacle detection unit 10, the PCS-ECU 40 calculates a TTC.

At Step S205, the PCS-ECU 40 determines whether the circumstance continues where the likelihood of the collision with the obstacle detected by the obstacle detection unit 10 has risen to a certain level. Specifically, the PCS-ECU 40 determines whether the calculated TTC is less than or equal to a predetermined time Toff_th2. If the TTC is less than or equal to the predetermined time Toff_th2, the PCS-ECU 40 determines that the circumstance continues where the likelihood of the collision with the obstacle detected by the obstacle detection unit 10 has risen to the certain level, and goes forward to Step S206. On the other hand, if the TTC is not less than or equal to the predetermined time Toff_th2, the PCS-ECU 40 determines that it is not a circumstance where the likelihood of the collision with the obstacle detected by the obstacle detection unit 10 has risen to the certain level, and goes forward to Step S213 to release the preliminary braking. Specifically, the PCS-ECU 40 transmits a request for releasing the preliminary braking to the brake ECU 80.

Note that the predetermined time Toff_th2 may be set equivalent to the predetermined time Ton_th2, or preferably set to a value greater than the predetermined time Ton_th2. By setting the predetermined time Toff_th2 to a value greater than the predetermined time Ton_th2, hunting can be prevented in which alarming is turned on and off frequently and repeatedly.

At Step S206, the PCS-ECU 40 determines whether the likelihood of the collision with the obstacle detected by the obstacle detection unit 10 has risen to a certain level. Specifically, the PCS-ECU 40 determines whether the calculated TTC is less than or equal to a predetermined time Ton_th3. If the TTC is not less than or equal to the predetermined time Ton_th3, the PCS-ECU 40 goes back to Step S204 to repeat Steps S204 to S206; or if the TTC is less than or equal to the predetermined time Ton_th3, the PCS-ECU 40 goes forward to Step S207.

At Step S207, the PCS-ECU 40 starts the AEB. Specifically, the PCS-ECU 40 transmits a request for automatic braking to the brake ECU 80. In response to the control command from the brake ECU 80, the brake actuator 90 starts operating to execute the automatic braking (a braking force of the vehicle 100 is generated automatically).

At Step S208, based on obstacle information (the distance to the obstacle and the relative speed of the obstacle) received from the obstacle detection unit 10, the PCS-ECU 40 calculates a TTC.

At Step S209, the PCS-ECU 40 determines whether the circumstance continues where the likelihood of the collision with the obstacle has risen to a certain level. Specifically, the PCS-ECU 40 determines whether the calculated TTC is less than or equal to a predetermined time Toff_th3. If the TTC is less than or equal to the predetermined time Toff_th3, the PCS-ECU 40 determines that the circumstance continues where the likelihood of the collision with the obstacle has risen to the certain level, and goes forward to Step S210. On the other hand, if the TTC is not less than or equal to the predetermined time Toff_th3, the PCS-ECU 40 determines that the likelihood of the collision with the obstacle is not high, and goes forward to Step S212.

Note that the predetermined time Toff_th3 may be set equivalent to the predetermined time Ton_th3, or preferably set to a value greater than the predetermined time Ton_th3. By setting the predetermined time Toff_th3 to a value greater than the predetermined time Ton_th3, hunting can be prevented in which alarming is turned on and off frequently and repeatedly.

At Step S210, the PCS-ECU 40 determines whether the vehicle 100 is stopped based on a vehicle speed signal received from the vehicle speed sensor 20. If the vehicle 100 is not stopped, the PCS-ECU 40 goes back to Step S208 to repeat Steps S208 to S210; or if the vehicle 100 is stopped, the PCS-ECU 40 goes forward to Step S211.

At Step S211, the PCS-ECU 40 executes brake holding. Specifically, the PCS-ECU 40 transmits a request for brake holding to the brake ECU 80. Thus, in response to the control command from the brake ECU 80, the brake actuator 90 starts operating to hold the braking force to maintain the stoppage of the vehicle 100 for a certain time.

At Step S212, the PCS-ECU 40 releases the AEB. Specifically, the PCS-ECU 40 transmits a request for releasing the automatic braking to the brake ECU 80. In response to the control command from the brake ECU 80, the brake actuator 90 starts operating, to release generating the braking force of the vehicle 100 automatically irrespective an operation by the driver.

Note that the PCS-ECU 40 may determine whether there is a likelihood of a collision between the vehicle 100 and the obstacle, and whether the likelihood is high or low, based on the distance D to the obstacle and the relative speed Vr of the obstacle, not limited to the TTC. In other words, the PCS-ECU 40 may execute the control process of the drive supports including the automatic braking to avoid a collision with the obstacle, based on the distance D to the obstacle and the relative speed Vr of the obstacle, not limited to the TTC. For example, based on the distance D to the obstacle and the relative speed Vr of the obstacle, the PCS-ECU 40 may determine whether it is possible to avoid a collision with the obstacle by a driving operation (a steering operation and/or a braking operation). If determining that it is not possible to avoid the collision with the obstacle by a driving operation, the PCS-ECU 40 may execute a control process to generate a braking force of the vehicle 100 automatically. More specifically, assuming that the relative speed Vr of the obstacle continues as it is, the PCS-ECU 40 may determine whether it is possible to avoid the collision with the obstacle, by a steering operation to move the vehicle 100 in a left or right direction until the distance D to the obstacle becomes zero. Also, under the same assumption, the PCS-ECU 40 may determine whether it is possible to avoid the collision with the obstacle by a current braking operation (whether it is possible to decelerate the vehicle 100 so that the relative speed Vr is less than or equal to zero) until the distance D to the obstacle becomes zero.

Referring to FIG. 1 again, the alarm buzzer 50 is an alarm unit to alert the driver of the vehicle 100 that there is a likelihood of a collision. The alarm buzzer 50 operates in response to an operation signal received from the PCS-ECU 40, to make a predetermined buzzer sound. Also, if receiving an operation release signal from the PCS-ECU 40 during the operation (buzzing), the alarm buzzer 50 stops the operation (stops making the predetermined buzzer sound).

The meter ECU 60 is an electronic control unit to control displaying on the meter 70. The meter ECU 60 may be configured with, for example, a microcomputer to execute various control processes by running various programs stored in a ROM, on a CPU. The meter ECU 60 is connected with the meter 70 via a direct line or the like, to communicate with each other. In response to a request for alarm display received from the PCS-ECU 40, the meter ECU 60 transmits a control command to the meter 70, to have the meter 70 display an alarm indicating a likelihood of a collision with an obstacle.

The meter 70 is an indication unit (display unit) to display various vehicle states (the vehicle speed, the engine rotational speed, the shift range, etc.) and various information items, to indicate them to the driver of the vehicle 100. In response to a control command from the meter ECU 60, the meter 70 displays an alarm (a predetermined indicator, for example, a character, a symbol, a figure, etc.) indicating that there is a likelihood of a collision with an obstacle.

The brake ECU 80 is an electronic control unit that executes braking control in the vehicle 100 (or controls operational states of the brake apparatus in the vehicle 100). The brake ECU 80 controls, for example, the brake actuator 90 that makes hydraulic brake apparatuses operate, which are placed at wheels of the vehicle 100. The brake ECU 80 may be configured with, for example, a microcomputer to execute various control processes, by running various programs stored in a ROM, on a CPU.

Note that the brake ECU 80 is connected with the brake actuator 90 to communicate with each other via a direct line or the like.

The brake ECU 80 may execute a control process to determine output (wheel cylinder pressure) of the brake actuator 90, usually in response to a braking operation by the driver. For example, the brake ECU 80 may set pressure of the master cylinder (master cylinder pressure) that corresponds to a braking operation, to be the output of the brake actuator 90 (wheel cylinder pressure).

Also, in response to a request for assisting received from the PCS-ECU 40, the brake ECU 80 executes a control process (PBA control) to generate a braking force, by adding an assisting braking force to the braking force corresponding to the braking operation by the driver. For example, the brake ECU 80 controls the brake actuator 90 to generate assisting pressure to be added to the master cylinder pressure that corresponds to the braking operation by the driver, and to output wheel cylinder pressure by adding the assisting pressure to the master cylinder pressure. Specifically, by controlling various valves, pumps, and the like included in the brake actuator 90, which will be described later, the brake ECU 60 has the brake actuator 90 generate the assisting pressure to be added to the master cylinder pressure that corresponds to the braking operation by the driver, and output the wheel cylinder pressure by adding the assisting pressure to the master cylinder pressure.

Also, in response to a request for preliminary braking or a request for automatic braking received from the PCS-ECU 40, the brake ECU 80 executes a control process (preliminary braking control or AEB control) to generate a braking force of the vehicle 100 automatically irrespective of the braking operation by the driver. For example, the brake ECU 80 controls the brake actuator 90 to generate predetermined oil pressure irrespective of master cylinder pressure, and to output the oil pressure as the wheel cylinder pressure. Specifically, by controlling various valves, pumps, and the like included in the brake actuator 90, which will be described later, the brake ECU 60 has the brake actuator 90 generate the predetermined oil pressure irrespective of the master cylinder pressure, and output the oil pressure as the wheel cylinder pressure. Also, if the vehicle 100 is an electrically driven vehicle, the brake ECU 80 may generate a braking force of the vehicle 100 automatically, by having the motor output (regenerative operation) controlled depending on a request for automatic braking from the PCS-ECU 40.

Also, in response to a request for preliminary braking received from the PCS-ECU 40, the brake ECU 80 executes a control process to turn on the stop lamp (not illustrated). Specifically, the brake ECU 80 transmits a drive signal to the relay driving the stop lamp to turn on the stop lamp.

Note that the PCS-ECU 40, the meter ECU 60, and the brake ECU 80 may be arbitrarily implemented by hardware, software, or firmware, or a combination of these as long as the functions described above can be implemented. Also, a part of or all of the functions of the PCS-ECU 40, the meter ECU 60, and the brake ECU 80 may be implemented by the other ECUs. For example, a part of or all of the functions of the brake ECU 80 may be implemented by the PCS-ECU 40, and a part of or all of the functions of the meter ECU 60 may be implemented by the PCS-ECU 40.

The brake actuator 90 is a unit to generate output that makes the brake apparatus (for example, the hydraulic brake apparatus described above) operate in the vehicle 100. The brake actuator 90 may include, for example, a pump (including a motor to drive the pump) to generate high oil pressure, various valves, and a hydraulic circuit, and may have any configuration as long as the output can be raised (for example, boosting the wheel cylinder pressure) irrespective of an amount of a brake operation by the driver. Typically, the brake actuator 90 may include a high oil pressure source other than the master cylinder (a pump or an accumulator to generate comparatively high oil pressure), or may adopt a configuration that is used for a brake-by-wire system represented by an electronically controlled braking system (ECB).

Next, a characteristic control process by the braking control apparatus 1 according to the embodiment, namely, a control process (automatic braking check process) that checks (including "inhibits") generation of the braking force by the automatic braking described above, will be described.

Figure 5:
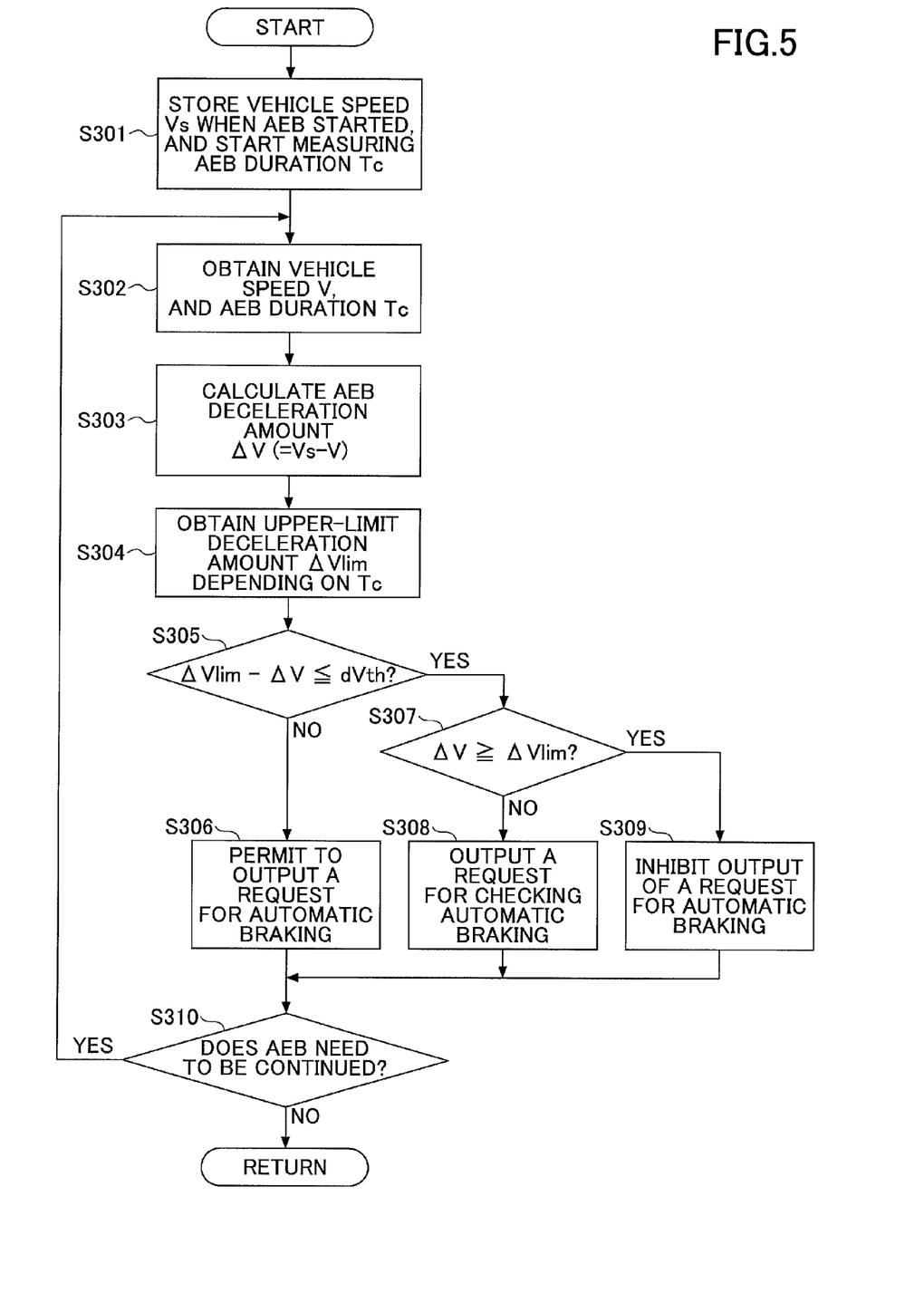
FIG. 5 is a flowchart that illustrates an example of an automatic braking check process by a braking control apparatus (PCS-ECU)

FIG. 5 is a flowchart that illustrates an example of the automatic braking check process by the braking control apparatus 1 according to the embodiment. A process of this flowchart is started in response to starting the AEB (automatic braking). Also, while executing a process of the flowchart, if a collision with an obstacle is detected by the collision detection unit 30, the PCS-ECU 40 terminates the process.

At Step S301, based on a vehicle speed signal received from the vehicle speed sensor 20, the PCS-ECU 40 has its internal memory store the vehicle speed Vs of the vehicle 100 at the start timing of the AEB (the vehicle speed Vs at the AEB start). Also, the PCS-ECU 40 starts measuring an elapsed time (AEB duration) Tc since the start of AEB by an internal timer.

At Step S302, the PCS-ECU 40 obtains the vehicle speed V of the vehicle 100, based on the vehicle speed signal received from the vehicle speed sensor 20, and obtains the AEB duration Tc.

At Step S303, the PCS-ECU 40 calculates the amount of deceleration since the start of the AEB (AEB deceleration amount) $\Delta V$, which is a value calculated by subtracting the vehicle speed V obtained at Step S302 from the vehicle speed Vs at the AEB start.

At Step S304, the PCS-ECU 40 obtains an upper-limit deceleration amount $\Delta V$lim that corresponds to the AEB duration Tc, for example, based on a predetermined conversion formula or a predetermined conversion table stored in the internal memory. The upper-limit deceleration amount $\Delta V$lim will be described later in detail.

At Step S305, the PCS-ECU 40 determines whether there is a likelihood that the AEB deceleration amount $\Delta V$ reaches the upper-limit deceleration amount $\Delta V$lim. Specifically, the PCS-ECU 40 determines whether a value subtracting the AEB deceleration amount $\Delta V$ from the upper-limit deceleration amount $\Delta V$lim is less than or equal to a predetermined threshold dVth. If the value subtracting the AEB deceleration amount $\Delta V$ from the upper-limit deceleration amount $\Delta V$lim is not less than or equal to the predetermined threshold dVth, the PCS-ECU 40 determines that there is no likelihood that the AEB deceleration amount $\Delta V$ reaches the upper-limit deceleration amount $\Delta V$lim, and goes forward to Step S306. On the other hand, if the value subtracting the AEB deceleration amount $\Delta V$ from the upper-limit deceleration amount $\Delta V$lim is less than or equal to the predetermined threshold dVth, the PCS-ECU 40 determines that there is a likelihood that the AEB deceleration amount $\Delta V$ reaches the upper-limit deceleration amount $\Delta V$lim, and goes forward to Step S307.

At Step S306, the PCS-ECU 40 permits to output a request for automatic braking.

At Step S307, the PCS-ECU 40 determines whether the AEB deceleration amount $\Delta V$ reaches the upper-limit deceleration amount $\Delta V$lim. Specifically, the PCS-ECU 40 determines whether the AEB deceleration amount $\Delta V$ is greater than or equal to upper-limit deceleration amount $\Delta V$lim. If the AEB deceleration amount $\Delta V$ is not greater than or equal to upper-limit deceleration amount $\Delta V$lim, the PCS-ECU 40 goes forward to Step S308; if the AEB deceleration amount $\Delta V$ is greater than or equal to upper-limit deceleration amount $\Delta V$lim, the PCS-ECU 40 goes forward to Step S309.

At Step S308, the PCS-ECU 40 transmits a request for automatic braking check to the brake ECU 80. In other words, the PCS-ECU 40 weakens (decreases) the braking force of the vehicle 100 automatically generated by the brake actuator 90 via the brake ECU 80.

At Step S309, the PCS-ECU 40 inhibits outputting a request for automatic braking.

At Step S310, the PCS-ECU 40 determines whether the AEB is in operation (whether the state continues that satisfies the operational condition of the AEB in the flowchart illustrated in FIG. 4). If the AEB is in operation, the PCS-ECU 40 goes back to Step S302 to repeat Steps S302 to S310; or if the AEB is not in operation, the PCS-ECU 40 terminates the process.

In this way, the braking control apparatus 1 according to the embodiment checks (including "inhibits") the automatic braking if a value subtracting the upper-limit deceleration amount $\Delta V$lim from the AEB deceleration amount $\Delta V$ is less than or equal to predetermined threshold ($\geq 0$). Specifically, the braking control apparatus 1 checks the automatic braking (weakens the braking force generated by the automatic braking) if there is a likelihood that the AEB deceleration amount $\Delta V$ reaches the upper-limit deceleration amount $\Delta V$lim (if the value subtracting the upper-limit deceleration amount $\Delta V$lim from the AEB deceleration amount $\Delta V$ is less than or equal to the predetermined threshold dVth). Also, the braking control apparatus 1 inhibits the automatic braking if the AEB deceleration amount $\Delta V$ reaches the upper-limit deceleration amount $\Delta V$lim (if the value subtracting the upper-limit deceleration amount $\Delta V$lim from the AEB deceleration amount $\Delta V$ is less than or equal to zero).

Here, the upper-limit deceleration amount $\Delta V$lim, will be described in detail using FIG. 6.

Figure 6A:
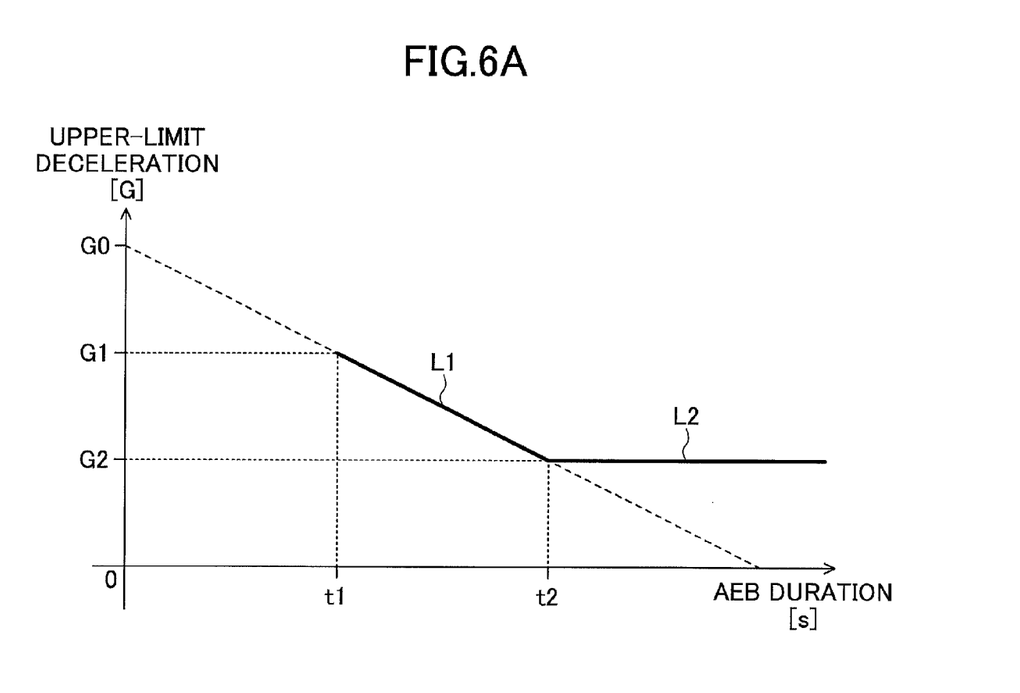
FIGS. 6A-6B are diagrams that illustrate a relationship between the upper-limit deceleration amount and the AEB duration.
Figure 6B:
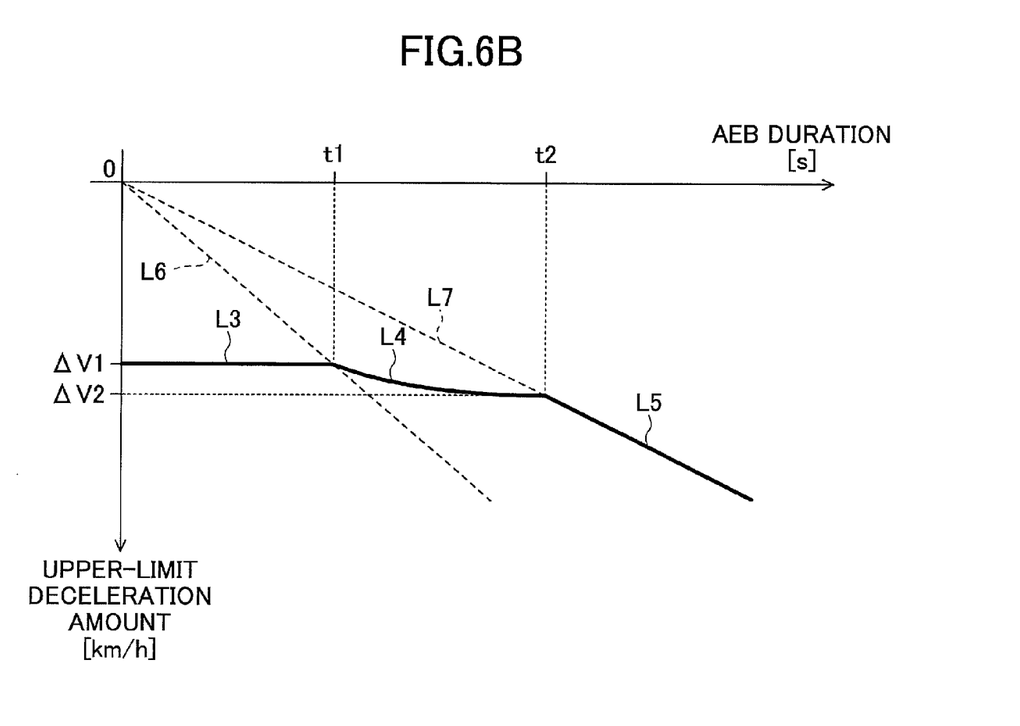

FIGS. 6A-6B are diagrams that illustrate a relationship between the upper-limit deceleration amount $\Delta V$lim and the AEB duration Tc. FIG. 6A is a diagram that illustrates a relationship between the upper-limit deceleration Glim and the AEB duration Tc where Glim is the basis for setting the upper-limit deceleration amount $\Delta V$lim. FIG. 6B is a diagram that illustrates a relationship between the upper-limit deceleration amount $\Delta V$lim and the AEB duration Tc where $\Delta V$lim is set based on the relationship in FIG. 6A.

Here, the upper-limit deceleration Glim is set, in principle, as an upper limit value of the deceleration (acceleration in the slowing-down direction) with which the driver of a following vehicle can take an appropriate driving operation (a braking operation and/or a steering operation) following the behavior (automatic braking) of the vehicle 100.

Referring to FIG. 6A, the upper-limit deceleration Glim is not set in a period after the AEB has been started (Tc=0) until the AEB duration Tc reaches a predetermined time t1 (referred to as the "first period" below).

In a period after the AEB duration To has passed the predetermined time t1 until Tc reaches a predetermined time t2 (referred to as the "second period" below), the upper-limit deceleration Glim is represented by a line segment L1 that linearly decreases while the time passes.

In a period after the AEB duration Tc has passed the predetermined time t2 (referred to as the "third period" below), the upper-limit deceleration Glim is represented by a line segment L2 that remains unchanged while the time passes.

A method for setting such a relationship between the upper-limit deceleration Glim and the AEB duration Tc will be described in detail.

First, if the vehicle 100 starts decelerating by activated AEB, the driver of a following vehicle may not be able to instantly recognize the deceleration to perform a driving operation following the deceleration. Therefore, the upper-limit deceleration Glim is not set in the first period during which the driver may recognize that the vehicle 100 starts decelerating by the automatic braking, and may become ready to start a driving operation.

In the second period during which the driver of the following vehicle may have recognized the deceleration of the vehicle 100 by the automatic braking, the inter-vehicle distance to the vehicle 100 becomes shorter and shorter while the time passes. Therefore, it is desirable to set the deceleration of the vehicle 100 to become less while the time passes so that the driver of the following vehicle can follow the behavior of the vehicle 100 to perform an appropriate driving operation.

Therefore, in the second period, the upper-limit deceleration Glim is represented by, for example, the line segment L1 that linearly decreases while the time passes.

Here, the line segment L1 is a linear line (Glim=A·Tc+B) by which the upper-limit deceleration Glim takes a predetermined value G1 when the AEB duration Tc takes the predetermined time t1, and takes a predetermined value G2 (<G1) when the AEB duration Tc takes the predetermined time t2. Also, the slope A (<0) of the linear line is represented by A=(G2−G1)/(t2−t1), and the intercept B of the linear line is a predetermined value G0. Alternatively, the upper-limit deceleration Glim in the second period may decrease non-linearly while the time passes.

On the other hand, as the driver of the following vehicle is attuned to the behavior of the vehicle 100 while the time passes, there is a tendency that the driver becomes able to perform an appropriate driving operation with deceleration that is high to a certain extent. Therefore, in the third period during which the driver of the following vehicle has been attuned to the behavior of the vehicle 100, the upper-limit deceleration Glim is represented by the line segment L2 that takes a constant value (predetermined value G2) unchanged while the time passes.

In summary, the upper-limit deceleration Glim is not set in the first period, and the upper-limit deceleration Glim is represented by Glim=Min (A·Tc+G0,G2) in the second and third periods.

Based on the upper-limit deceleration Glim set in this way, the relationship is set between the upper-limit deceleration amount ΔVlim and the AEB duration Tc as illustrated in FIG. 6B.

First, the upper-limit deceleration Glim is not set in the first period as described above, namely, the driver may not be able to recognize the deceleration of the vehicle 100 by the automatic braking, to start a driving operation. Therefore, in the first period, the upper-limit deceleration amount ΔVlim is set to a constant value to allow a certain deceleration amount ΔV in the relationship with the AEB duration Tc. Specifically, the upper-limit deceleration amount ΔVlim is represented by a line segment L3 that takes a constant value (a predetermined value ΔV1) unchanged while the time passes as illustrated in FIG. 6B.

In the second and third periods, the upper-limit deceleration Glim (=Min (A·Tc+G0,G2)) is set as described above. Therefore, the upper-limit deceleration amount ΔVlim is set by a product of the upper-limit deceleration Glim and the AEB duration Tc (ΔVlim=Glim·Tc).

More specifically, in the second period, the upper-limit deceleration amount ΔVlim is set to ΔVlim=A·Tc²+G0·Tc. As illustrated in FIG. 6B, the upper-limit deceleration amount ΔVlim is represented by a quadratic curve L4 in the relationship with the AEB duration Tc.

Note that if the upper-limit deceleration Glim decreases non-linearly in the second period while the time passes as mentioned above, the upper-limit deceleration amount ΔVlim in the second period is represented by a corresponding curve other than a quadratic curve.

Also, in the third period, the upper-limit deceleration amount ΔVlim is set to ΔVlim=G2·Tc. As illustrated in FIG. 6B, the upper-limit deceleration amount ΔVlim is represented by a line segment L5 that linearly increases in the relationship with the AEB duration Tc.

Note that the predetermined value ΔV1 corresponding to the upper-limit deceleration amount ΔVlim when the AEB duration Tc takes the predetermined time t1 is ΔV1=G1·t1. Also, the predetermined value ΔV2 corresponding to the upper-limit deceleration amount ΔVlim when the AEB duration Tc takes the predetermined time t2 is ΔV1=G2·t2. Also, the relationship between the predetermined values ΔV1 and ΔV2 is ΔV1<ΔV2.

In summary, in the first period, the upper-limit deceleration amount ΔVlim is set to a constant value unchanged while the time passes. On the other hand, in the second and third periods, the upper-limit deceleration amount ΔVlim is set to increase while the time passes. Especially, the increasing tendency (increasing rate) of the upper-limit deceleration amount ΔVlim while the time passes is set higher in the third period than in the second period.

Figure 7:
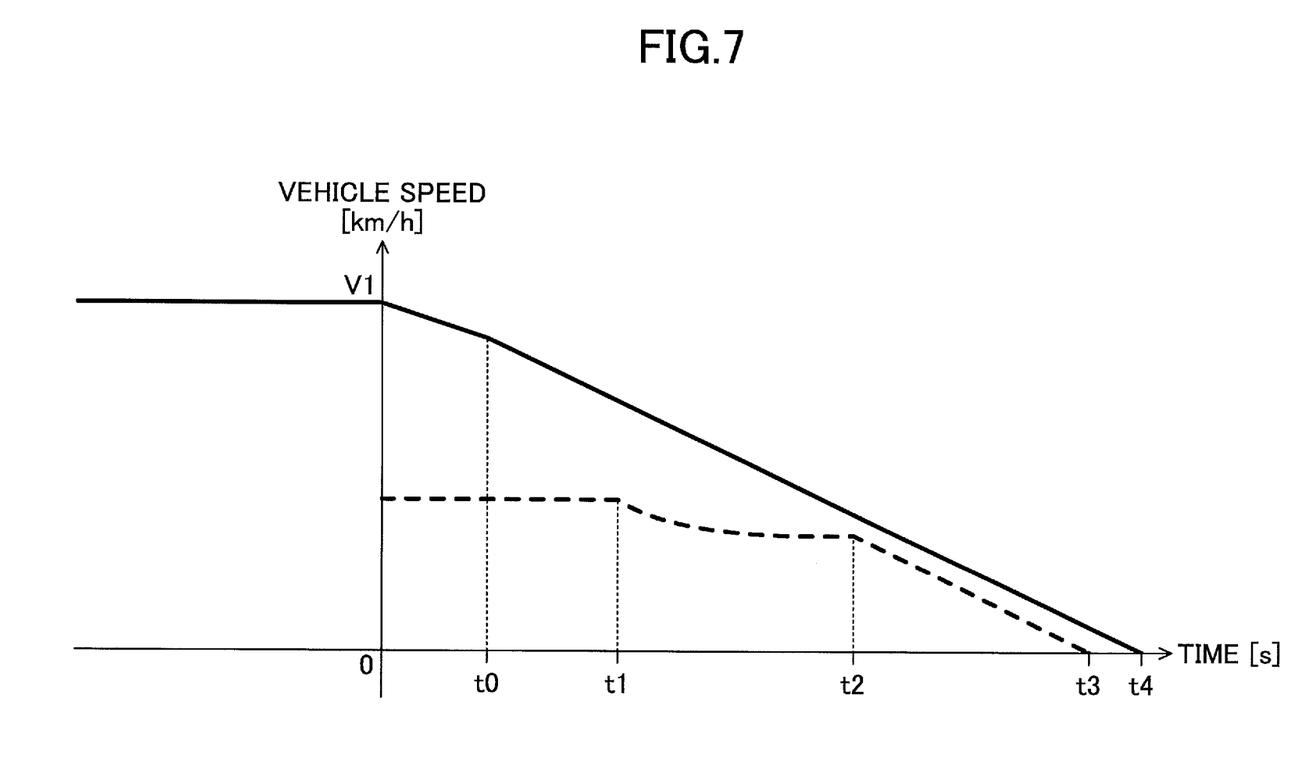
FIG. 7 is a diagram that illustrates an example of vehicle speed change with respect to the time caused by AEB.
Figure 8:
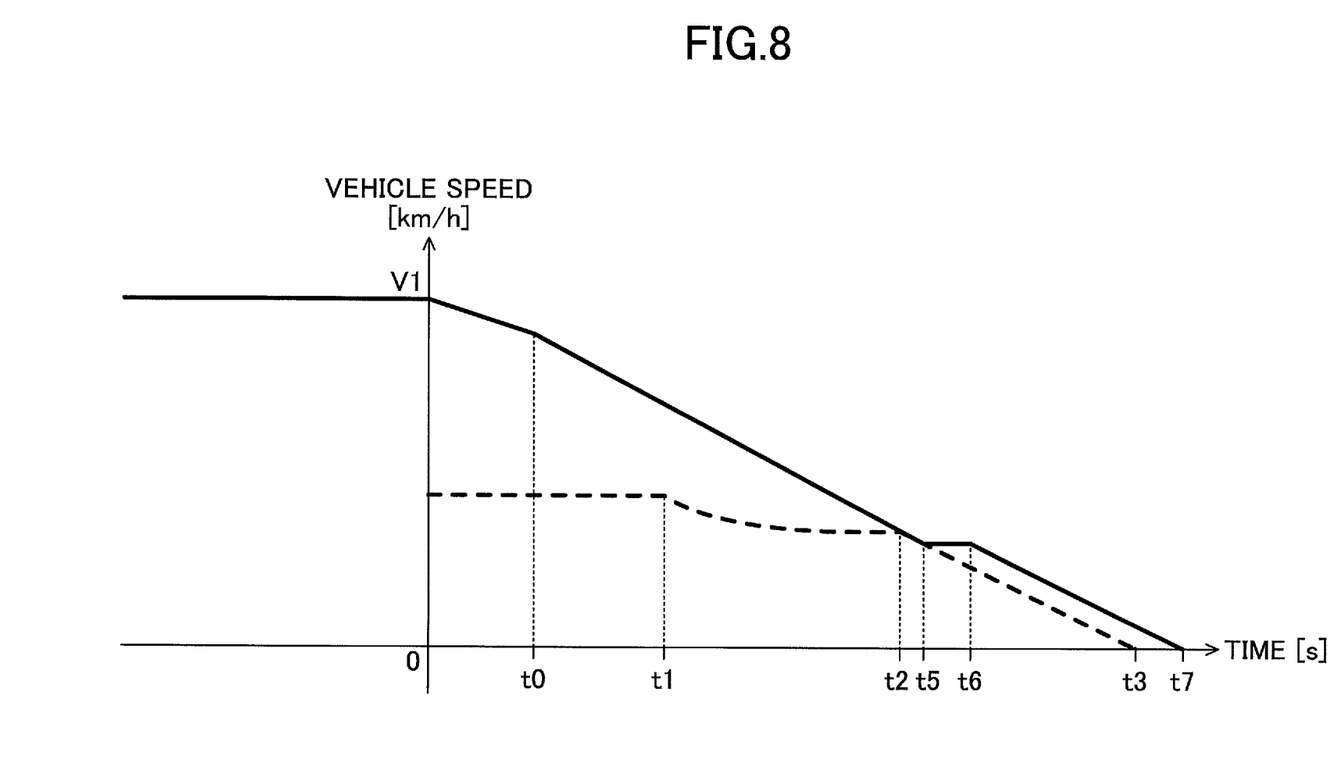
FIG. 8 is a diagram that illustrates another example of vehicle speed change with respect to the time caused by AEB.

FIG. 7 and FIG. 8 are diagrams that illustrate specific examples of vehicle speed change by the AEB while the time passes when the automatic braking check process is executed by the braking control apparatus 1 (the PCS-ECU 40), based on the relationship between the upper-limit deceleration amount ΔVlim and the AEB duration Tc illustrated in FIG. 6B. FIG. 7 is a diagram that illustrates an example of vehicle speed change by the AEB while the time passes in a case where the automatic braking check (Steps S308 and 309 in FIG. 5) is not executed (a case where the braking control apparatus 1 operates as expected). FIG. 8 is a diagram that illustrates another example of vehicle speed change by the AEB while the time passes in a case where the automatic braking check is executed (a case where the braking control apparatus 1 operates unexpectedly).

For the sake of simplicity, it will be described with FIG. 8 in which Step S308 in FIG. 5 (outputting a request for automatic braking check) is omitted. Also, in FIG. 7 and FIG. 8, the operation start timing of the AEB is time 0. Also, around time t0, the braking force (deceleration) exhibits a gradual change by the automatic braking (AEB). Also, at time t3, the upper-limit deceleration amount ΔVlim takes a value equivalent to the vehicle speed Vs at the AEB start (=predetermined value V1) of the vehicle 100. In other words, after time t3, the vehicle 100 will be stopped by the automatic braking.

As illustrated in FIG. 7, the PCS-ECU 40 normally has the vehicle 100 brake automatically by a deceleration pattern that prevents the deceleration amount ΔV from reaching the upper-limit deceleration amount ΔVlim illustrated in FIG. 6B, namely, a value subtracting the deceleration amount ΔV from the upper-limit deceleration amount ΔVlim will not be less than or equal to zero. Therefore, the PCS-ECU 40 can stop the vehicle 100 at time t4 after time t3, while changing the deceleration in two stages from the vehicle speed Vs at the AEB start (predetermined value V1).

However, if the braking control apparatus 1 operates unexpectedly, for example, a braking force greater than expected is generated due to a failure in the oil pressure system, the deceleration amount ΔV may reach the upper-limit deceleration amount ΔVlim (time t5) as illustrated in FIG. 8. At this moment, the PCS-ECU 40 inhibits the automatic braking (Step S309 in FIG. 5). After that, the upper-limit deceleration amount ΔVlim becomes greater than the deceleration amount ΔV, and the PCS-ECU 40 permits to output a request for automatic braking at time t6 (Step S306 in FIG. 5), namely, the automatic braking is resumed. Then, at time t7 after time t3, the vehicle 100 is stopped.

In this way, the upper-limit deceleration amount ΔVlim is set as a limit value with which the driver of a following vehicle can take an appropriate driving operation following the automatic braking of the vehicle 100, based on a qualitative relationship between the AEB duration Tc and a driving operation by the driver of the following vehicle following the automatic braking of the vehicle 100. Therefore, if a value subtracting the upper-limit deceleration amount ΔVlim from the AEB deceleration amount ΔV is less than or equal to the predetermined threshold (≥0), by weakening the braking force by the automatic braking (setting the braking force to zero), the driver of the following vehicle can perform an appropriate driving operation following the automatic braking of the vehicle 100.

Also, the braking control apparatus 1 according to the embodiment normally has the vehicle 100 brake automatically by a deceleration pattern that prevents the deceleration amount ΔV from reaching the upper-limit deceleration amount ΔVlim, namely, a value subtracting the deceleration amount ΔV from the upper-limit deceleration amount ΔVlim will not be less than or equal to zero. This also makes it possible for the driver of the following vehicle to perform an appropriate driving operation following the automatic braking of the vehicle 100.

Also, the upper-limit deceleration amount ΔVlim is set to change with respect to the AEB duration Tc (to increase as a whole while the time passes since the start of AEB). Specifically, it is set to increase while the time passes after the predetermined time t1 has passed since the start of AEB. Thus, the automatic braking is not susceptible to be checked by the automatic braking check process described above, and hence, a collision with the obstacle ahead of the vehicle 100 can be avoided appropriately. In other words, the braking control apparatus 1 according to the embodiment can have the vehicle 100 brake automatically to avoid a collision with the obstacle ahead of the vehicle 100 appropriately, while allowing the driver of the following vehicle to perform an appropriate driving operation following the behavior of the vehicle 100 avoiding the collision.

Also, the braking control apparatus 1 according to the embodiment executes the automatic braking check process, by monitoring the deceleration amount ΔV of the vehicle 100 based on the upper-limit deceleration amount ΔVlim, instead of monitoring the deceleration of the vehicle 100 based on the upper-limit deceleration Glim. This makes it possible to execute the automatic braking check process with better precision. More specifically, as described above, the upper-limit deceleration amount ΔVlim is set based on the upper-limit deceleration Glim. Therefore, the deceleration of the vehicle 100 (deceleration detected by a known acceleration sensor (not illustrated)) may be monitored based on the upper-limit deceleration Glim directly. However, it is highly likely that the deceleration to be detected by an acceleration sensor is deceleration of the vehicle 100 that is added to deceleration caused by a short-time behavior of the vehicle body such as a nose dive due to the automatic braking of the vehicle 100. Therefore, the deceleration of the vehicle 100 detected by such an acceleration sensor is deceleration of the vehicle 100 including a considerable error (detected as a value greater than the actual deceleration). Therefore, precision of the automatic braking check process may be reduced, and, for example, the automatic braking may be checked (inhibited) unnecessarily. On the other hand, since the vehicle speed change of the vehicle 100 is an integral value of the acceleration (deceleration). The vehicle speed change is less affected (has a less error) by short-time behavior of the vehicle body due to the automatic braking of the vehicle 100, than the deceleration. Therefore, by monitoring the deceleration amount ΔV of the vehicle 100 based on the upper-limit deceleration amount ΔVlim, it possible to execute the automatic braking check process with better precision.

Second Embodiment

Next, a second embodiment will be described.

A braking control apparatus 1 according to the second embodiment differs from the first embodiment in that the upper-limit deceleration amount ΔVlim is changed depending on a factor other than the AEB duration Tc. In the following, the same elements as in the first embodiment are assigned the same codes, and different parts will be mainly described.

The PCS-ECU 40 includes a known self-diagnosis function, and is capable of detecting a fault in itself, the obstacle detection unit 10 (the radar sensor 11 and the camera sensor 12) and the like. If detecting a fault in one of the radar sensor 11 and the camera sensor 12, the PCS-ECU 40 changes the setting so that the upper-limit deceleration amount ΔVlim is reduced. For example, values of the upper-limit deceleration amount ΔVlim with respect to the AEB duration Tc are offset by a predetermined amount as a whole toward the side in the decreasing direction from those illustrated in FIG. 6B.

Specifically, as described above, the obstacle detection unit 10 generates obstacle information (the distance to an obstacle, the relative speed of the obstacle, etc.) by integrating detection results of the radar sensor 11 and the camera sensor 12. Therefore, if a fault occurs in one of them, precision of the obstacle information by the obstacle detection unit 10 may be reduced (for example, a marking on the road side, which is not supposed to be a target of the drive support, may be detected as an obstacle, or precision may be reduced for the distance to an obstacle and/or the relative speed of the obstacle). In other words, the AEB may start operating unnecessarily (the automatic braking is executed). The driver of the following vehicle may be driving while paying attention to a circumstance ahead of the vehicle 100, and hence, may be taken by surprise if the automatic braking of the vehicle 100 is executed unnecessarily, and may not be able to take an appropriate driving operation following the automatic braking of the vehicle 100. Therefore, by reducing the upper-limit deceleration Glim as a whole with respect to the AEB duration Tc, even if the automatic braking of the vehicle 100 is executed unnecessarily, the driver of the following vehicle can perform an appropriate driving operation following the automatic braking of the vehicle 100. In other words, by reducing the upper-limit deceleration amount ΔVlim in accordance with the reduction of the upper-limit deceleration Glim, even if the automatic braking of the vehicle 100 is executed unnecessarily, the driver of the following vehicle can perform an appropriate driving operation following the automatic braking of the vehicle 100.

Note that the PCS-ECU 40 changes the deceleration pattern during the AEB (automatic braking) to prevent the deceleration amount ΔV from reaching the upper-limit deceleration amount ΔVlim that has been changed.

Also, the upper-limit deceleration amount ΔVlim is set depending on the fault rate of the PCS-ECU 40 as a factor taken into consideration in advance in the design phase. Specifically, the upper-limit deceleration amount ΔVlim may be set to be less while the fault rate of the PCS-ECU 40 is higher. This leads to substantially the same operations and effects. In other words, if a fault occurs in the PCS-ECU 40, the likelihood becomes high that the automatic braking of the vehicle 100 is executed unnecessarily. Therefore, the upper-limit deceleration amount ΔVlim may be set to be less while the fault rate of the PCS-ECU 40 is higher. Thus, even if the automatic braking of the vehicle 100 is executed unnecessarily, the driver of the following vehicle can perform an appropriate driving operation following the automatic braking of the vehicle 100.

Note that the fault rate of the PCS-ECU 40 may be set based on an experiment using an actual device or a computer simulation.

The embodiments have been described in detail. Note that embodiments are not limited to the above specific embodiments, but various changes, substitutions, and alterations could be made.

The present application is based on and claims the benefit of priority of Japanese Priority Application No. 2015-015959, filed on Jan. 29, 2015, the entire contents of which are hereby incorporated by reference.

The invention claimed is:

1. A vehicle braking control apparatus, comprising:
an obstacle detection unit configured to detect an obstacle ahead of a vehicle, and to detect a distance to the obstacle from the vehicle, and a relative speed of the obstacle with respect to the vehicle;
an electronic control unit configured
to generate a braking force of the vehicle automatically based on the distance and the relative speed, and
to weaken the braking force when a value subtracting a deceleration amount of a vehicle speed of the vehicle since a start of generating the braking force, from a predetermined upper-limit deceleration amount is less than or equal to a predetermined threshold,
wherein the upper-limit deceleration amount is set to increase while an elapsed time increases since the start of generating the braking force, at least after a predetermined first time has passed since the start of generating the braking force.

2. The vehicle braking control apparatus as claimed in claim 1, wherein the upper-limit deceleration amount is set to increase in a period after a predetermined second time longer than the first time has passed since the start of generating the braking force, with a rate of increase higher than in a period after the first time has passed and before the second time passes, since the start of generating the braking force.

3. The vehicle braking control apparatus as claimed in claim 1, wherein the upper-limit deceleration amount is set to be constant irrespective of the elapsed time in a period before the first time passes since the start of generating the braking force.

4. The vehicle braking control apparatus as claimed in claim 1, wherein the electronic control unit inhibits generating the braking force when the subtracted value is less than or equal to zero set as the predetermined threshold.

5. The vehicle braking control apparatus as claimed in claim 1, wherein the electronic control unit generates the braking force avoiding the subtracted value becoming less than or equal to zero.

6. The vehicle braking control apparatus as claimed claim 1, wherein the obstacle detection unit includes a plurality of sensors capable of detecting the distance and the relative speed, and integrates detection results of the distance and the relative speed of the sensors, to detect the distance and the relative speed,
wherein the upper-limit deceleration amount is set to be decreased when at least one of the sensors has a fault.

* * * * *